United States Patent

Sakaguchi et al.

Patent Number: 5,263,779
Date of Patent: Nov. 23, 1993

[54] THRUST BALL-BEARING

[75] Inventors: Takahiro Sakaguchi; Yohji Abe, both of Tokyo; Daihachiro Takasu, Niiza; Hiroshi Sugahara, Tokyo, all of Japan

[73] Assignee: TEAC Corporation, Tokyo, Japan

[21] Appl. No.: 990,129

[22] Filed: Dec. 14, 1992

[30] Foreign Application Priority Data

Dec. 24, 1991 [JP] Japan .............................. 3-106367[U]

[51] Int. Cl.⁵ .......................... F16C 33/66; F16C 33/46
[52] U.S. Cl. ...................................... 384/470; 384/606; 384/614
[58] Field of Search ................. 384/470, 606, 614, 623

[56] References Cited

U.S. PATENT DOCUMENTS

| 1,913,275 | 6/1933 | Herrmann | 384/606 |
| 2,072,515 | 3/1937 | Delaval-Crow | 384/614 |
| 3,414,341 | 12/1968 | Murphy | 384/606 |

FOREIGN PATENT DOCUMENTS 1175109 12/1969 United Kingdom ............... 384/623

Primary Examiner—Thomas R. Hannon
Attorney, Agent, or Firm—Ladas & Parry

[57] ABSTRACT

A thrust ball-bearing in which a good lubrication is maintained for a long period of time and having a long service life. The bearing comprises a plurality of balls having a uniform diameter, a retainer which retains the balls, and two plates situated at either side of the retainer and rotatable relative to each other via the balls. The retainer has a thickness less than the diameter of the ball. A plurality of holes that retain each ball is provided on the retainer and a groove having a rectangular cross section is formed in a portion between two adjacent holes. An amount of grease applied to the ball is collected inside the groove and provided to the ball located on the downstream side of flowing grease without moving outwardly of the groove even if a centrifugal force generated by a rotation of the bearing is exerted.

5 Claims, 6 Drawing Sheets

THRUST BALL-BEARING

BACKGROUND OF THE INVENTION

The present invention generally relates to a thrust ball-bearing, and more particularly to a thrust ball-bearing in which a plurality of balls are held in predetermined positions by a retainer situated between two plates.

A description will be given of an example of a conventional thrust ball-bearing with reference to FIG. 1 and FIG. 2. FIG. 1 is an enlarged cross sectional view of a disk driving motor in a conventional FDD (Floppy Disk Drive) apparatus, and FIG. 2 is an exploded view of a bearing portion of the disk driving motor shown in FIG. 1.

A spindle shaft holder 6 is fixed on a chassis 1 and a plurality of coils 4 radially surround the shaft holder 6 on the chassis 1. A spindle shaft 2 is fixed, by press fitting, to a turn-table 3 that rotates with a disk loaded thereon. A magnet 5 is provided on an inner surface of the turn-table 3 in a position such that the magnet 5 faces the coils 4. Additionally, one end of the spindle shaft 2 is inserted into the spindle shaft holder 6 and thus the turn-table 3 is rotatably supported on the chassis 1.

A thrust force applied in an axial direction of the spindle shaft 2 of the turn-table 3 is carried by a ball bearing 11 which comprises plates 7 and 10, a retainer 8 and a plurality of balls 9. Each of the balls 9 are rotatably retained by being situated inside equally spaced holes formed on the annular retainer 8. The retainer 8 is sandwiched between the two annular plates 7 and 10 from the upper side and the bottom side. Portions of each ball 9 protrude from the upper surface and the bottom surface of the retainer 8 such that the plates 7 and 10 make contact with the balls 9; thus the plates 7 and 10 are rotatable relative to each other via the balls 9.

In such a ball bearing structure, it is usual to apply an amount of grease on a surface of the balls 9 at assembly time so that friction between the balls and plates is reduced and the bearing can maintain a smooth rotation.

However, since the grease applied to the ball rotates together with the ball, the grease is scooped by an edge of the hole that retains each ball and the grease is collected in portions between the retainer 8 and the plates 7 and 10. A centrifugal force is exerted on the grease, which force is generated by a rotation of the bearing. Since the grease gradually moves outwardly from a portion where the ball 9 makes contact with the plates 7 and 10, the lubrication of the ball is reduced.

Ball-bearings such as above mentioned are generally adopted for use in home appliances to which home appliances periodical application of grease is not provided as in the case of industrially used appliances. Therefore, when an amount of grease decreases, from the surface of the ball 9, after a considerable time of use, friction between the ball 9 and the plates 7 and 10 increases.

As mentioned above, when the lubrication of the ball is decreased, wear of the balls and plates is increased and thus there is a problem in that a life of the ball bearing becomes short.

SUMMARY OF THE INVENTION

It is a general object of the present invention to provide a novel and improved thrust ball-bearing in which the above mentioned disadvantages are eliminated.

A more specific object of the present invention is to provide a thrust ball-bearing that has a long service life obtained by a long lubrication time due to an amount of grease being kept inside the bearing.

In order to achieve the above mentioned objects, a thrust ball-bearing according to the present invention comprises:

a plurality of balls having a uniform diameter;

an annular retainer, having a thickness less than a diameter of the balls, being provided with circumferentially arranged holes, each of the holes receiving and rotatably retaining therein one each of the balls, and being provided with a plurality of recesses, each connecting adjacent holes and formed on portion between any two adjacent holes on a surface of the retainer, each of the recesses having an outer side wall nearly perpendicular to a radial direction of the retainer; and two annular plates situated one at either side of the retainer so that the plates sandwich the balls in order to perform a relative rotational movement.

According to the present invention, the edge formed by the hole and the recess scoops the grease, and the scooped greased is collected inside the recess. The grease inside the recess is prevented, by means of the outer side wall of the recess, from outward movement caused by centrifugal force. Thus the grease remains inside the recess and is applied to the ball again; this results in a long service life of the bearing due to a long lubrication time by the grease.

Other objects, features, and advantages according to the present invention will become more apparent from the following detailed description when read in conjunction with the accompanying drawings.

BRIEF DESCRIPTION OF THE DRAWINGS

FIGS. 4 are views of an essential part of the embodiment shown in FIG. 3.

FIGS. 6 are views of an essential part of the embodiment shown in FIG. 5.

DETAILED DESCRIPTION OF THE PREFERRED EMBODIMENTS

Figure 1:
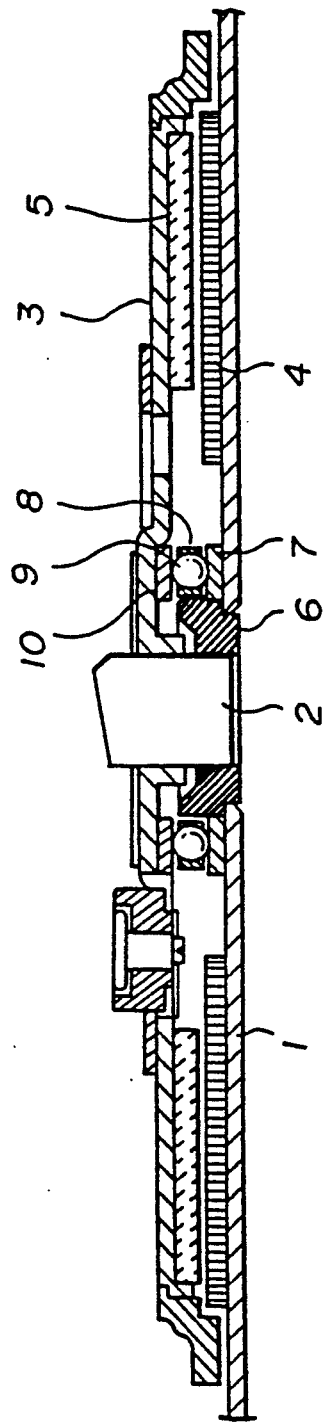
FIG. 1 is an enlarged cross sectional view of a driving motor of a conventional FDD apparatus.
Figure 2:
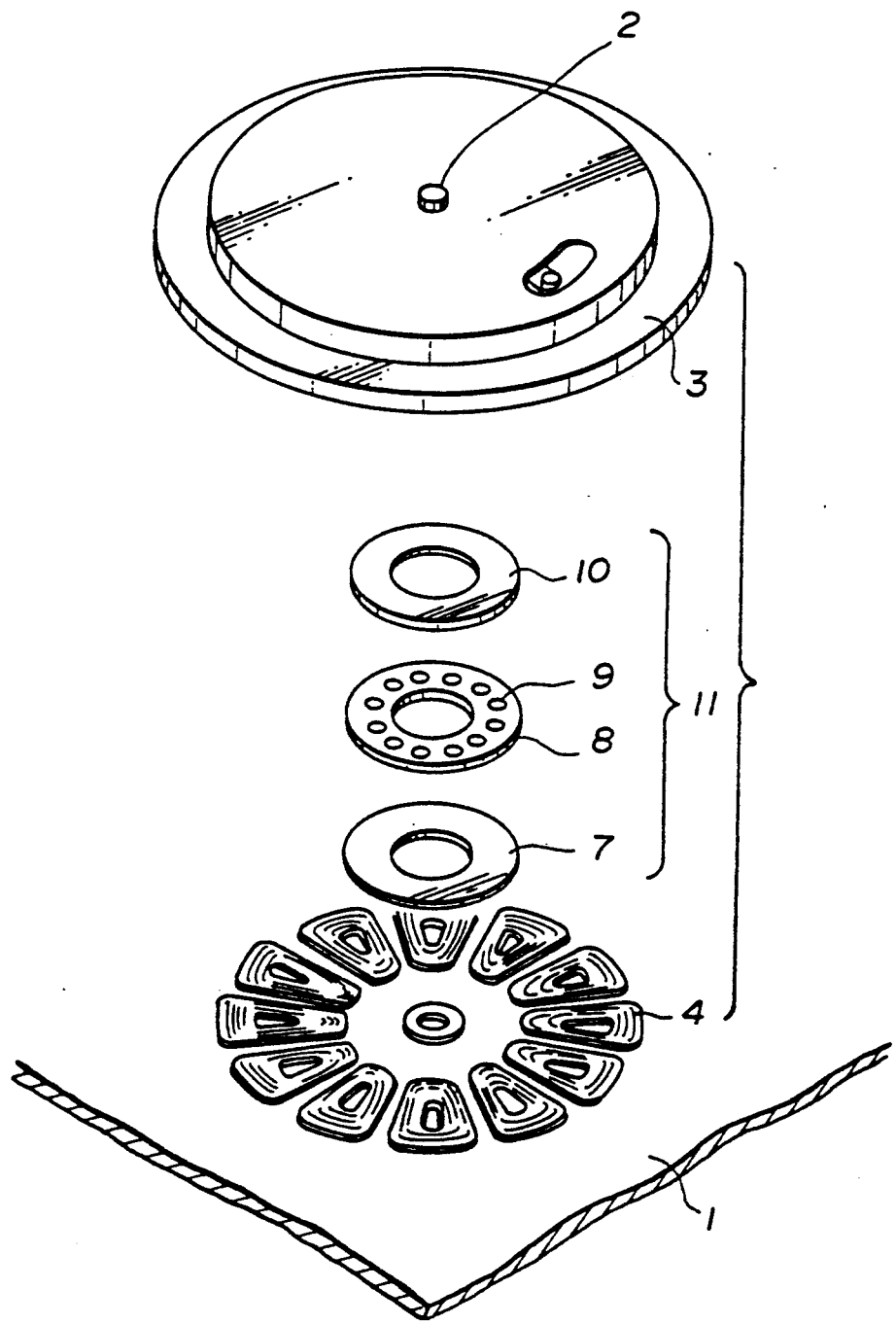
FIG. 2 is an exploded view of the thrust ball-bearing shown in FIG. 1.
Figure 3:
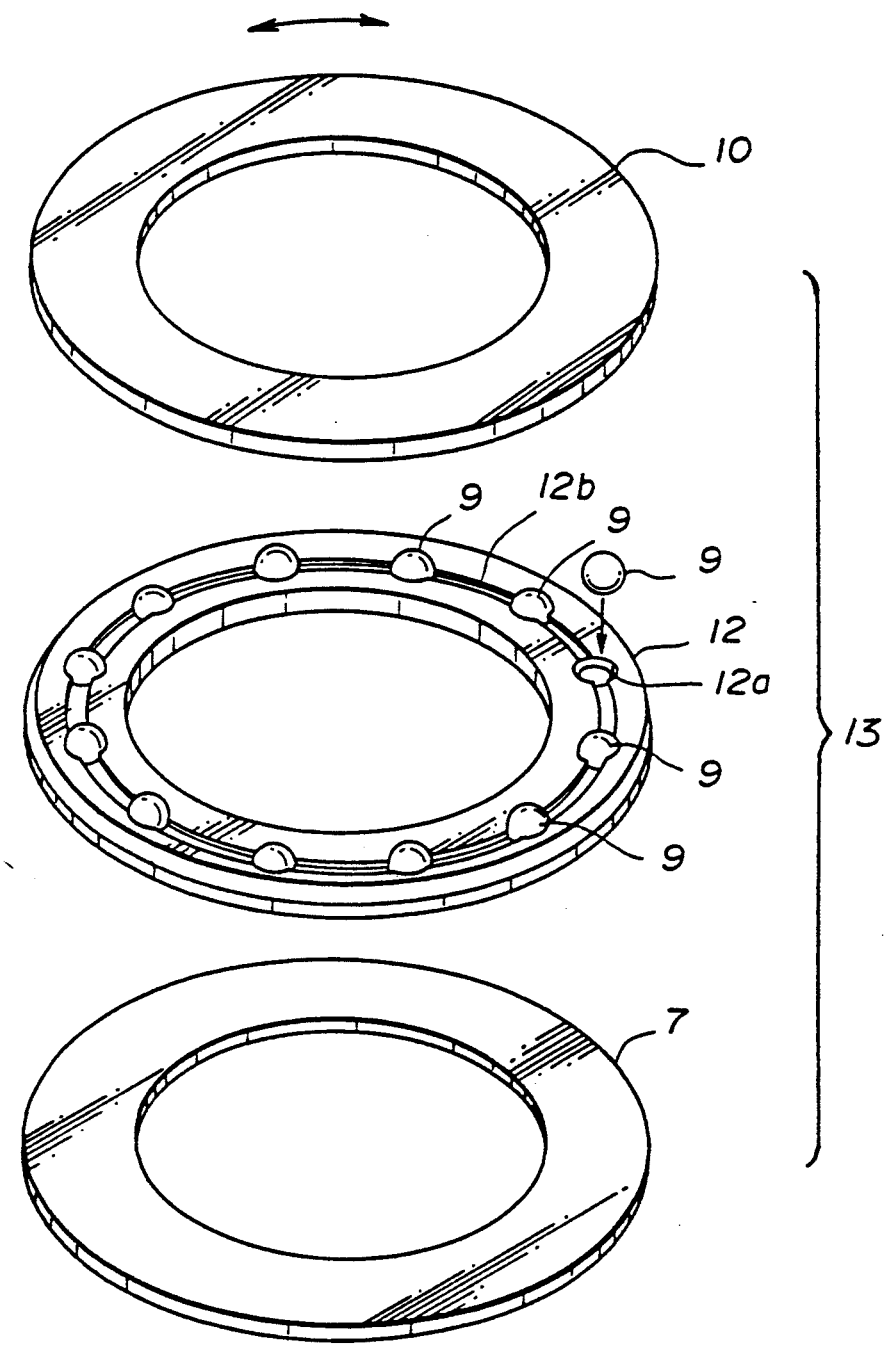
FIG. 3 is an exploded view of a first embodiment of a thrust ball-bearing according to the present invention.
Figure 4A:
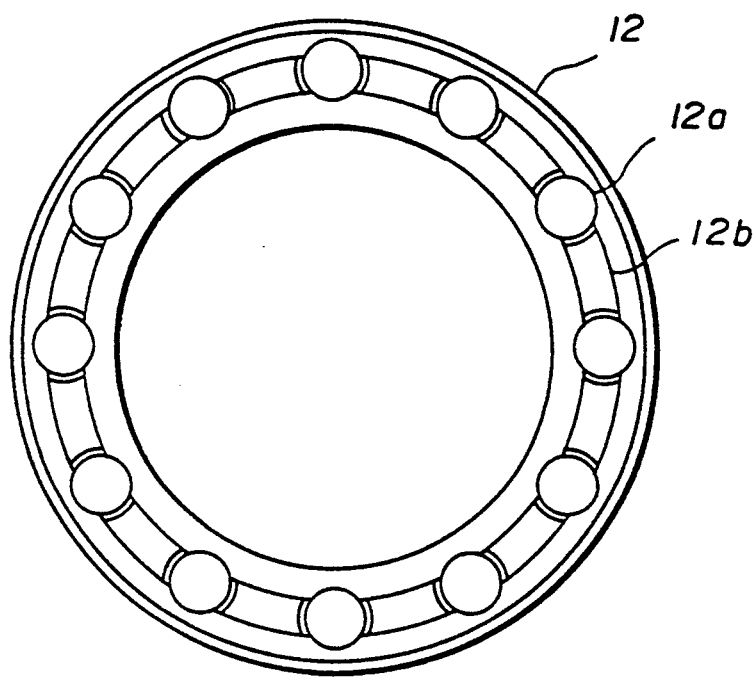
FIG. 4A shows a plan view.
Figure 4B:
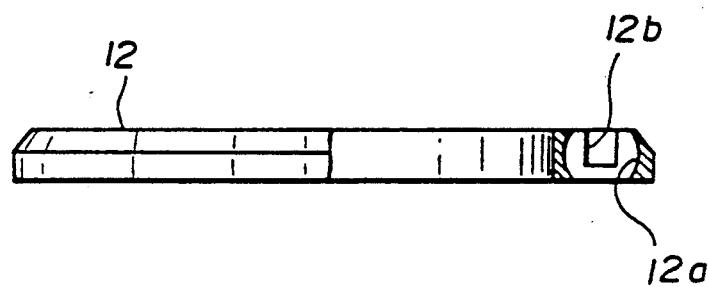
FIG. 4B shows a partially cutaway side view.

A description will be given of a first embodiment of a thrust ball-bearing according to the present invention with reference to FIGS. 3, 4A and 4B. FIG. 3 is an exploded view of a first embodiment of a thrust ball-bearing 13 according to the present invention, and FIG. 4A is a plan view of a retainer, which is an essential part of the first embodiment, and FIG. 4B is a partially cutaway side view of the retainer. It should be noted that the thrust ball-bearing 13 of this embodiment is, similarly to the above mentioned conventional thrust ball-bearing, used in a spindle motor of an FDD apparatus.

As shown in FIG. 3, the thrust ball-bearing 13 of this embodiment comprises a plurality of balls 9, for example made of steel, a retainer 12, and two plates 7 and 10. The retainer 12 formed in an annular plate-like shape is provided with twelve circumferentially arranged and equally spaced spherical ball retaining holes 12a. An arc-shaped groove 12b is provided in each space between adjacent holes 12a, and each end of the each of the grooves 12b is connected to respective holes 12a. The grooves 12b have a width smaller than a diameter of the hole 12a, and the groove's cross section has a rectangular shape, so that an outer side wall of the grooves 12b lies nearly perpendicular to the radial direction of the retainer 12. Each groove 12b is formed along a circumference of the retainer including a center-point of each hole 12a.

The thrust ball-bearing 13 of this embodiment comprises the retainer 12, in which a ball 9 is respectively provided in each hole 12a, and the plates 7 and 10 made, for example, of steel, the plate 7 and 10 being respectively located on either sides of the retainer 12. Each ball 9 is rotatable in a state where the ball 9 is situated in the hole 12a of the retainer 12. Since a thickness of the retainer is slightly less than a diameter of the ball 9, portions of the ball 9 protrude from the upper and bottom surfaces of the retainer 12. Accordingly, the plate 7 and the plate 10 can rotate relative to each other while a thrust force, which exerts a force in a direction perpendicular to the plane of the retainer, is applied thereon.

When assembling the ball bearing 13, an amount of grease, which is used for lubrication, is applied to a surface of each ball 9 and inside each groove 12b.

When the plate 10 rotates with respect to the plate 7 in either of directions indicated by arrows in FIG. 3, each ball 9 tends to move in a direction tangential to a rotational direction of the plate 10. However, since a radial movement of the balls 9 is restricted by the retainer 12, each ball 9 performs a rotational movement corresponding to that of the plate 10. The retainer 12 rotates in the same direction as the balls 9 rotate. The rotational speed of the retainer 12 is approximately half of that of the plate 10.

During the rotation of the retainer 12, the grease provided inside the grooves 12b experiences a centrifugal force and tends to move outwardly. However, the movement of the grease inside the grooves 12b is prevented by an outer side wall of the grooves 12b, and thus the grease cannot easily go out of the grooves 12b. Since the grease rotates as the retainer rotates, a force due to inertia is exerted on the grease, and the grease tends to move in a direction opposite to the rotational direction of the retainer 12. By this inertia of the grease, the grease slowly moves toward the ball 9 located in the downstream side of the grease flow, and the grease finally comes in contact with a surface of the ball 9 situated on the downstream side thereof.

As mentioned above, the grease inside the grooves 12b is applied to the balls 9 without the grease moving out from the grooves 12b due to a centrifugal force generated by a rotation of the ball bearing. Therefore, the ball bearing 13 of this embodiment is able to have a long lubrication time, thus obtaining a long service life of the bearing.

Figure 5:
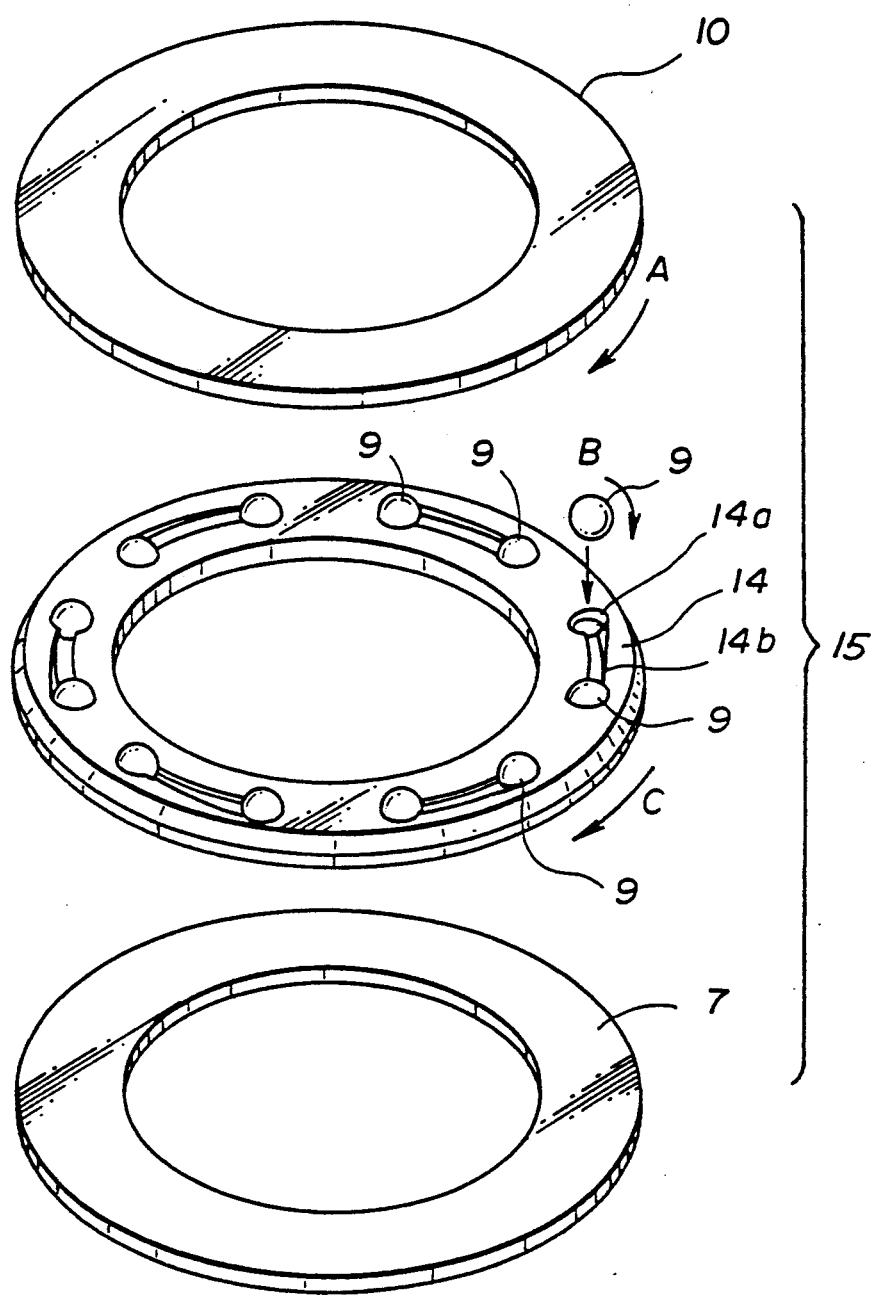
FIG. 5 is an exploded view of a second embodiment of a thrust ball-bearing according to the present invention.
Figure 6A:
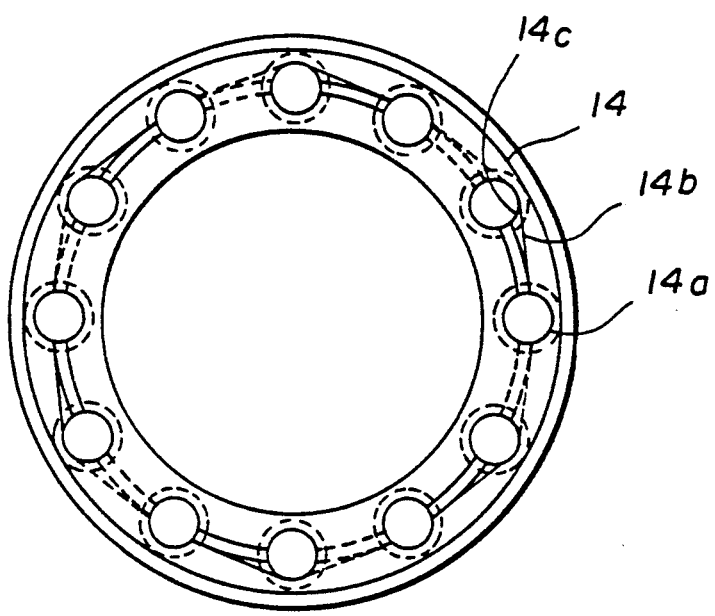
FIG. 6A shows a plan view.
Figure 6B:
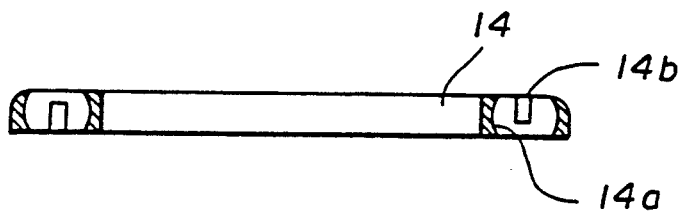
FIG. 6B shows a cross sectional view.

Next, a description will be given, with reference to FIGS. 5, 6A and 6B, of a second embodiment of a thrust ball-bearing according to the present invention. FIG. 5 is an exploded view of a second embodiment of a thrust ball-bearing 15 according to the present invention, FIG. 6A is a plan view of a retainer, which is an essential part of the second embodiment, and FIG. 6B is a cross sectional view of the retainer. It should be noted that the thrust ball-bearing 15 of this embodiment is, similarly to the above mentioned conventional thrust ball-bearing, used in a spindle motor of an FDD apparatus.

Similarly to the first embodiment, the retainer 14 formed in an annular plate-like shape is provided with twelve circumferentially arranged and equally spaced spherical ball retaining holes 14a. An arc-shaped groove 14b is provided in each space between adjacent holes 14a and each end of each of the grooves 14b is connected to respective holes 14a. However, unlike in the first embodiment, one half of each of the grooves 14b is provided on one surface (top surface) of the retainer 14 and the other half of each of the grooves 14b is provided on the opposite surface (bottom surface) of the retainer 14. The grooves 14b are alternately provided on the surfaces of the retainer 14, that is, only one of either top surface or bottom surface grooves 14b is provided between adjacent holes 14a on the retainer 14.

A width of each groove 14b on one end gradually increases toward the outside of a radial direction, and the width of each groove 14b at an edge connected to the respective hole 14a reaches to the outermost point of the hole 14a, as shown in FIG. 6A.

Wide ends of grooves 14b located on the same surface of the retainer 14 are directed along the same direction along the circumference of the retainer 14. The wide ends of each groove 14a on the opposite surface of the retainer 14 are directed all in the same direction opposite to that of the other surface mentioned above.

When the plate 10 rotates in a direction indicated by an arrow A of FIG. 5, the balls 9 rotate in a direction indicated by an arrow B of FIG. 5; causing a rotation of the retainer 14 in a direction indicated by an arrow C of FIG. 5. The rotational speed of the retainer 14 is approximately half of that of the plate 10.

The grease, adhered to a surface of each of the balls 9, rotates with the balls 9 and is scooped by edges 14c of the widened sides of the grooves 14b. Accordingly, the scooped grease is collected inside the grooves 14b. Similarly to the first embodiment, the grease inside the grooves 14b moves towards the downstream side and lubricates the balls 9.

As mentioned above, in this embodiment, the grease is collected from a wide area of a surface of the ball 9. The grease can be collected on both sides of the retainer 14 as the grooves 14b are provided on both surfaces of the retainer 14.

Accordingly, the grease inside the groove 14b is maintained inside the grooves 14b for a long period of time and is applied to the balls 9 for lubrication without moving out of the grooves 14b due to a centrifugal force generated by a rotation of the ball bearing 15. Therefore, an improvement is obtained in the service life of the bearing 15.

Although the thrust ball-bearing of the first embodiment has grooves provided only on one surface and the bearing of the second embodiment has grooves provided alternately on the surfaces of the retainer, it should be noted that this is due to the thickness of the retainer being small, the groove may be provided at every portion between adjacent holes on both the surfaces of the retainer if the thickness is sufficient to form the grooves thusly.

The present invention is not limited to the specifically disclosed embodiments, and variations and modifications may be made without departing from the

What is claimed is:

1. A thrust ball-bearing comprising:
    a plurality of balls having a uniform diameter;
    an annular retainer having a thickness less than the diameter of said balls, being provided with circumferentially arranged holes, each of said holes receiving and rotatably retaining therein one of said balls, and being provided with a plurality of recesses, each recess formed on a portion of a surface of said retainer between adjacent holes and connecting said adjacent holes, each of said recesses including a groove having an outer side wall nearly perpendicular to a radial direction of said retainer; and
    two annular plates respectively situated at each side of said retainer so that said plates sandwich said balls in order to perform a relative rotation.
    wherein said grooves are formed along a concentric circle including a center of each of said holes, and wherein at least one end of each of said grooves connecting to said respective hole is widened outwardly in the radial direction of said retainer.

2. The thrust ball-bearing as claimed in claim 1, wherein said groove is provided at either surface of said retainer.

3. The thrust ball-bearing as claimed in claim 2, wherein a direction of wide portions of said grooves formed on one surface is opposite to a direction of wide portions of said grooves formed on the other surface of said retainer.

4. A thrust ball-bearing comprising:
    a plurality of balls having a uniform diameter;
    an annular retainer having a thickness less than the diameter of said balls, being provided with circumferentially arranged holes, each of said holes receiving and rotatably retaining therein one of said balls, and being provided with a plurality of grooves, each groove formed on a portion of a surface of said retainer between adjacent holes to connect said adjacent holes and retaining a grease therein, each of said grooves having an outer side wall nearly perpendicular to a radial direction of said retainer and being formed along a concentric circle including a center of each of said holes; and
    two annular plates respectively situated at each side of said retainer so that said plates sandwich said balls in order to perform a relative rotation, whereby the grease inside each groove is supplied to the balls through ends of the groove during the rotation.

5. The thrust ball-bearing as claimed in claim 4, wherein a width of said grooves is smaller than a diameter of said holes.

* * * * *